(12) United States Patent
Hsu et al.

(10) Patent No.: US 7,755,883 B2
(45) Date of Patent: Jul. 13, 2010

(54) CONNECTION STRUCTURE AND DATA PROCESSING APPARATUS THEREWITH

(75) Inventors: Chih Chiang Hsu, Kuei Shan Hsiang (TW); Chia Cheng Tang, Kuei Shan Hsiang (TW); Chien Jung Su, Kuei Shan Hsiang (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 287 days.

(21) Appl. No.: 11/907,211

(22) Filed: Oct. 10, 2007

(65) Prior Publication Data
US 2008/0124189 A1   May 29, 2008

(30) Foreign Application Priority Data
Nov. 24, 2006   (TW) .............................. 95220798 U

(51) Int. Cl.
G06F 1/16   (2006.01)
(52) U.S. Cl. ............................ 361/679.17; 361/679.09; 361/679.58; 312/223.1; 400/679
(58) Field of Classification Search ............ 361/679.09, 361/679.17
See application file for complete search history.

(56) References Cited

U.S. PATENT DOCUMENTS

| | | | | |
|---|---|---|---|---|
| 5,483,418 A | * | 1/1996 | Hosoi | 361/679.55 |
| 5,510,953 A | * | 4/1996 | Merkel | 361/679.08 |
| 6,038,892 A | * | 3/2000 | Schmitt | 70/78 |
| 6,493,215 B1 | * | 12/2002 | Chiang et al. | 361/679.08 |
| 6,697,047 B2 | * | 2/2004 | Agata | 345/161 |
| 6,731,269 B2 | * | 5/2004 | Horiuchi et al. | 345/168 |
| 6,922,333 B2 | * | 7/2005 | Weng et al. | 361/679.2 |
| 2004/0190233 A1 | * | 9/2004 | Yu et al. | 361/680 |
| 2005/0029908 A1 | * | 2/2005 | Fang | 312/223.2 |
| 2009/0059488 A1 | * | 3/2009 | Minaguchi et al. | 361/679.09 |

* cited by examiner

*Primary Examiner*—Jayprakash N Gandhi
*Assistant Examiner*—Anthony Q Edwards
(74) *Attorney, Agent, or Firm*—Thomas, Kayden, Horstemeyer & Risley

(57) ABSTRACT

The invention provides a connection structure installed in a data processing apparatus. The data processing apparatus includes a keyboard and a base. The keyboard includes a bottom. The base includes a top plate. The connection structure connects the bottom and the top plate. The connection structure includes a mounted boss and a mounting hole. The mounted boss is disposed on the bottom of the keyboard. The mounted boss includes a groove. The mounting hole is disposed on the top plate of the base. The mounting hole includes a protrusion. When the bottom of the keyboard is assembled to the top of the base, the mounted boss would fit into the mounting hole, such that the protrusion is locked with the groove.

18 Claims, 4 Drawing Sheets

CONNECTION STRUCTURE AND DATA PROCESSING APPARATUS THEREWITH

BACKGROUND OF THE INVENTION

1. Field of the Invention

The present invention relates to a connection structure, particularly for connecting a keyboard with a base in a data processing apparatus.

2. Description of the Prior Art

There are electrical apparatuses with keyboards recently, such as notebook, personal digital assistant, and other electrical apparatuses with keyboards. In these apparatuses, the keyboards are usually mounted by screwing with screws or lock protrusions disposed on the circumference of the keyboard. In the method of screwing, it is usually to screw the screws from the bottom of the electrical apparatus to mount the keyboard on the top of the base of the electrical apparatus. In the operation of assembling the keyboard, the keyboard faces downwards and the bottom of the electrical apparatus faces upwards, so that an operator can easily screw from up to down. However, the keyboard falls off very easily in this operation so that the screwing operation fails and the keyboard is even damaged. Please refer to FIG. 1A. FIG. 1A is a sketch diagram illustrating a notebook according to the prior art and temporary lock protrusions P1 of the keyboard thereof. Although the temporary lock protrusions P1 can be disposed at the connection position in advance where the keyboard is connected to the top of the base, the temporary lock protrusions P1 are designed for temporarily supporting the keyboard and therefore, the strength thereof is weak. The sustainable load thereof is limited, and the temporary lock protrusions P1 may fail due to a shake or impact. Furthermore, in the screwing, the temporary lock protrusions P1 also need to sustain the screwing force partially, and it may still fail.

In the method of disposing elastic lock protrusions to mount the keyboard, there are elastic lock protrusions P2 disposed on the circumference of the connection position where the keyboard is connected to the top of the base of the electrical apparatus, then the keyboard is disposed directly on the top of the base, and the elastic lock protrusions P2 lock the circumference of the keyboard, as shown in FIG. 1B. FIG. 1B is a sketch diagram illustrating another notebook according to the prior art and the elastic lock protrusions P2 of the keyboard thereof. However, the keyboard is mounted only by the elastic lock protrusions P2 disposed on a plurality of areas of the circumference of the keyboard. It causes both the effect that the other unmounted portions of the keyboard are loose and the fact that portions in the connection where the elastic lock protrusions P2 contacts the keyboard sustain higher stress when the electrical apparatus shakes, so as to cause a crack or the elastic lock protrusions P2 fail.

Accordingly, a scope of the invention provides a connection structure for connecting a keyboard with a base in a data processing apparatus, so as to solve the problem mentioned above.

SUMMARY OF THE INVENTION

A scope of the invention provides a connection structure for connecting a keyboard with a base in a data processing apparatus.

According to a preferred embodiment, a connection structure of the invention is applied to a data processing apparatus. The data processing apparatus includes a keyboard and a base. The keyboard includes a bottom. The base includes a top plate. The connection structure connects the bottom with the top plate, i.e. connects the keyboard and the base. The connection structure includes a mounted boss and a mounting hole. The mounted boss is disposed on the bottom of the keyboard and includes a first lock part. The mounting hole is disposed on the top plate and includes a second lock part. When the bottom of the keyboard is assembled to the top plate of the base, the mounted boss is inserted into the mounting hole such that the first lock part is locked with the second lock part.

Therein, the first lock part can be a groove, and the second lock part is a protrusion. Furthermore, the groove has a first cross section, and the protrusion has a second cross section matching with the first cross section, so that the first lock part can be locked with the second lock part. In addition, the first cross section can be semicircular, wedgy or other shapes. Similarly, the first lock part can be a protrusion, and the second lock part is a groove, so that the first lock part can be locked with the second lock part.

Furthermore, the mounting hole has a third cross section, and the mounted boss has a fourth cross section matching with the third cross section, whereby the mounted boss can be inserted into the mounting hole and the first lock part is locked with the second lock part. Therein, the third cross section of the mounting hole is elliptic, polygonal or other shapes. It is worth noticing that the fourth cross section of the mounted boss is not necessary to be elliptic or polygonal correspondingly, but it is necessary that the fourth cross section of the mounted boss allows the mounted boss to be inserted into the mounting hole and then the first lock part can be locked with the second lock part.

According to the preferred embodiment, the mounted boss further includes a threaded hole so that the base can mount the keyboard on the top plate by screwing a screw into the threaded hole. Hence, the keyboard is more firmly mounted on the top plate of the base.

Accordingly, the connection structure of the invention can mount the keyboard without the elastic lock protrusions. Besides, when the mounted boss further includes the threaded hole for enhancing the mounting of the keyboard onto the base, the keyboard will not fall from the base while screwing.

The advantage and spirit of the invention may be further understood by the following recitations together with the appended drawings.

BRIEF DESCRIPTION OF THE APPENDED DRAWINGS

DETAILED DESCRIPTION OF THE INVENTION

Figure 1A:
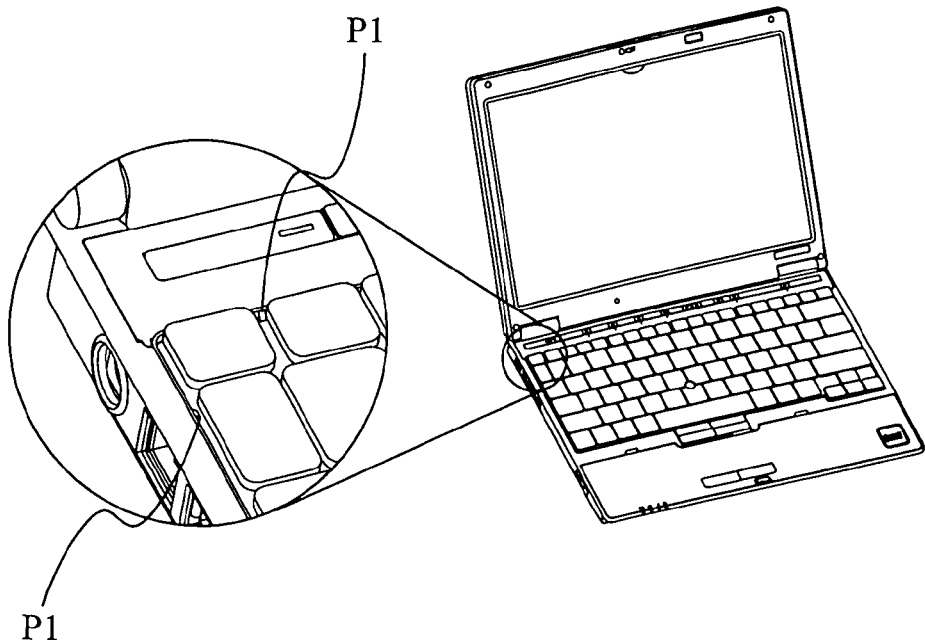
FIG. 1A is a sketch diagram illustrating a notebook according to the prior art and temporary lock protrusions of the keyboard thereof.
Figure 1B:
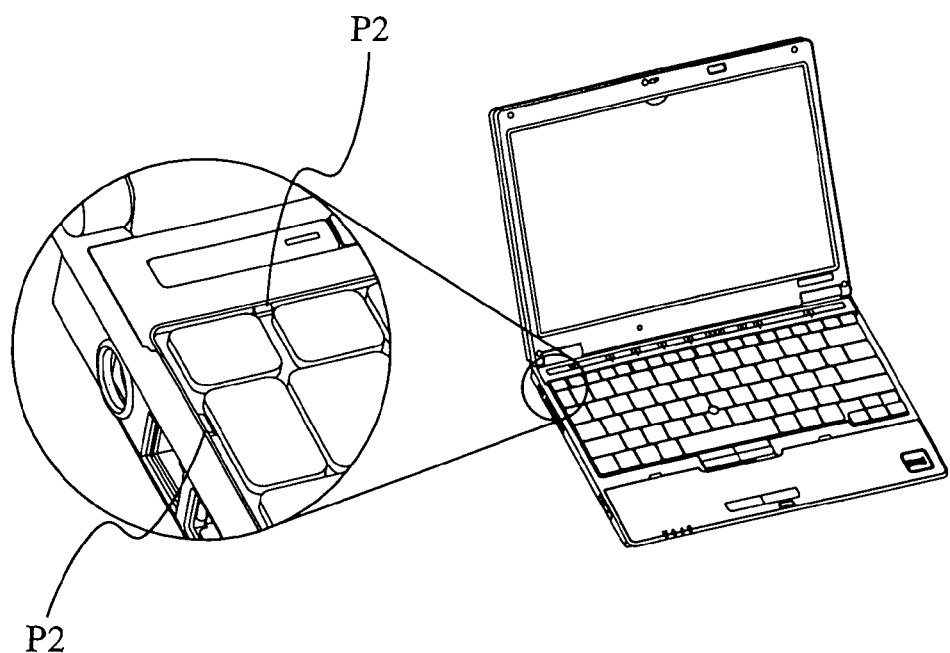
FIG. 1B is a sketch diagram illustrating another notebook according to the prior art and the elastic lock protrusions of the keyboard thereof.
Figure 2A:
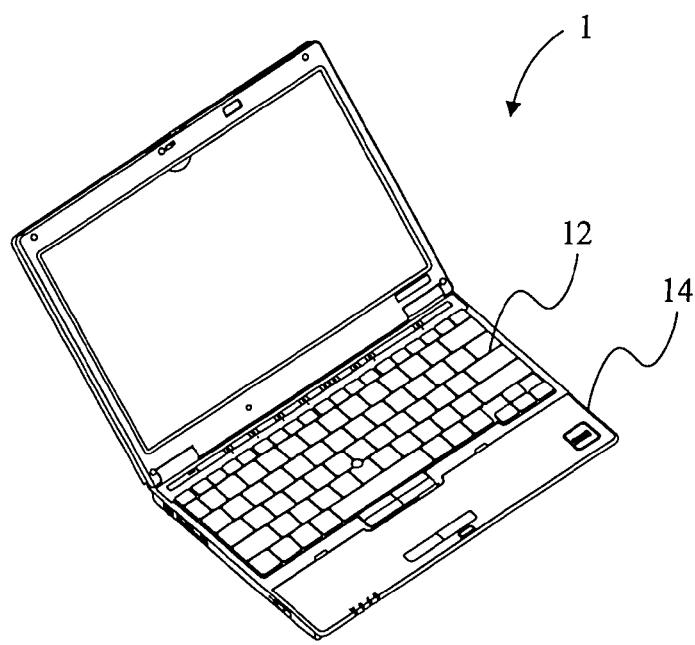
FIG. 2A is a sketch diagram according to a preferred embodiment of the invention.

Please refer to FIG. 2A. FIG. 2A is a sketch diagram according to a preferred embodiment. According to the preferred embodiment, a connection structure is applied to a data processing apparatus 1. The data processing apparatus 1 can be a notebook, a personal digital assistant, or other data processing apparatuses with keyboards. According to the preferred embodiment, the data processing apparatus 1 is a notebook, which includes a keyboard 12 and a base 14.

Figure 2B:
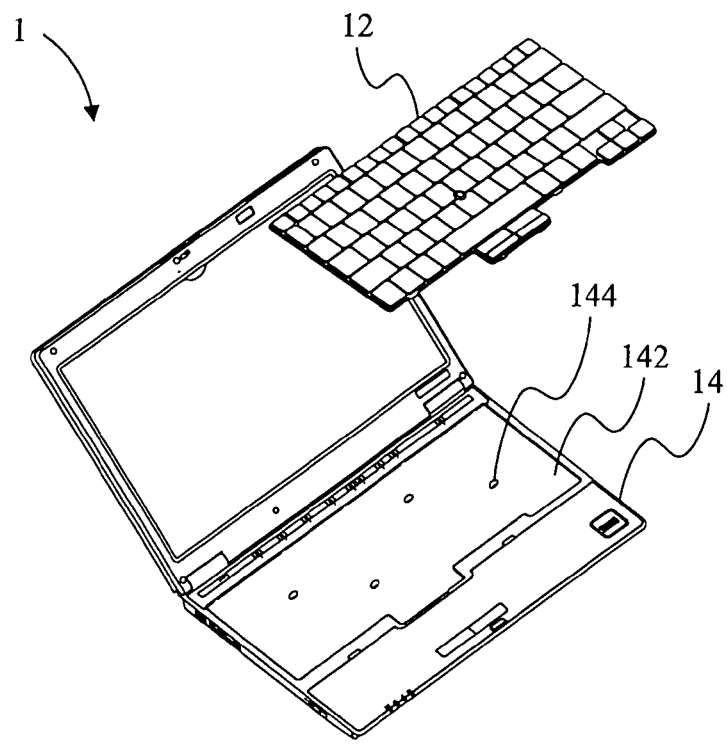
FIG. 2B is a partial exploded view of the data processing apparatus 1.
Figure 2C:
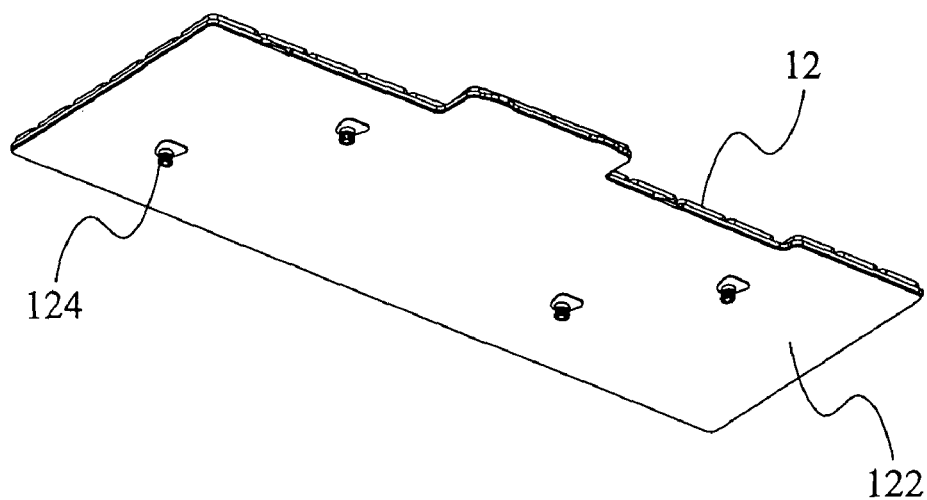
FIG. 2C is a sketch diagram illustrating the bottom of the keyboard.

Please refer to FIGS. 2B and 2C together. FIG. 2B is a partial exploded view of the data processing apparatus 1. The keyboard 12 includes a bottom 122 (Please refer to FIG. 2C. FIG. 2C is a sketch diagram illustrating the bottom 122 of the keyboard 12.). The base 14 includes a top plate 142. According to the preferred embodiment, the connection structure includes four mounted bosses 124 disposed on the bottom 122 of the keyboard 12 and four mounting holes 144 disposed on the top plate 142 of the base 14. It is worth noticing that both the quantity of the mounted bosses 124 and the mounting holes 144 and the location thereof depends on design.

Figure 2D:
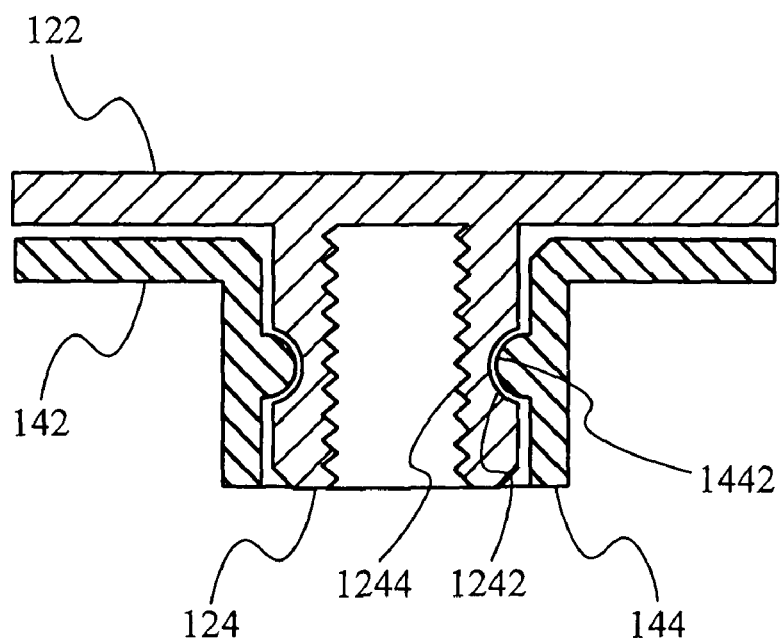
FIG. 2D is a cross section of the engagement of the mounted boss and the mounting hole.

Please refer to FIG. 2D. FIG. 2D is a cross section of the engagement of the mounted boss 124 and the mounting hole 144. The mounted boss 124 includes a first lock part. The mounting hole 144 includes a second lock part. Whereby, when the bottom 122 of the keyboard 12 is assembled to the top plate 142 of the base 14, the mounted bosses 124 are inserted into the mounting holes 144 respectively, such that the first lock part is locked with the second lock part. According to the preferred embodiment, the first lock part is a ring groove 1242, and the second lock part is a ring rib 1442. When the mounted bosses 124 are inserted into the mounting holes 144, the ring groove 1242 is locked with the ring rib 1442, as shown in FIG. 2D.

It is worth noticing that the second lock part is not limited to the ring rib, and it can be a protrusion only or a combination thereof, such as a point protrusion, a short rib, or a plurality of point protrusions. Similarly, the first lock part is also not limited to the ring groove, and it can be a groove or a combination thereof, wherein the groove includes a hole, a groove, or a concavity of other form. For example, a hole can be locked with a point protrusion; a groove can be locked with a short rib or a ring rib; a wedgy concavity can be locked with a wedgy protrusion or a protrusion, and so on. Besides, it is not necessary that the cross profile of the first lock part is similar to the cross profile of the second lock part, but it is needed that the first lock part can still be locked with the second lock part. For example, when the second lock part is a semicircular rib, then the first lock part can be a semicircular groove or a rectangle groove. In addition, the first lock part and the second lock part are conceptually related. That is, the first lock part can be a protrusion, while the second lock part is a groove. The description for this case is same as the aforementioned, and is not further described.

Figure 2E:
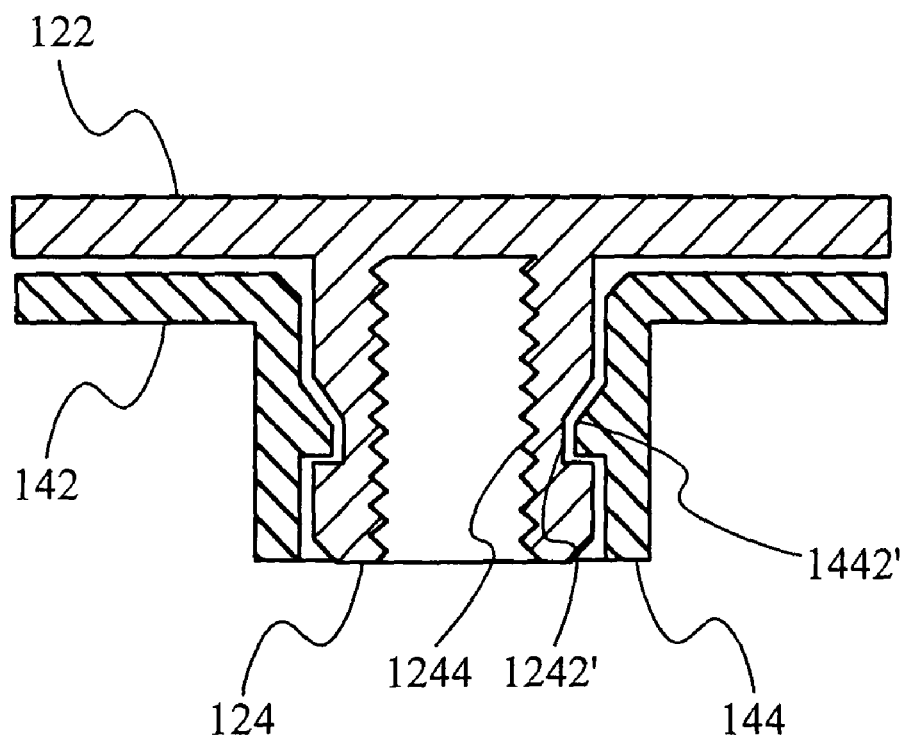
FIG. 2E is a cross section of another engagement of the mounted boss and the mounting hole.

According to the preferred embodiment, the cross section of the ring groove 1242 is semicircular, and the cross section of the ring rib 1442 is also semicircular. However, in some case, the effect of easy insertion and difficult extraction is achieved by designing the first lock part and the second lock part. For example, the first lock part is designed as a wedgy concavity 1242', and the second lock part is designed as a wedgy protrusion 1442' (also could be a rectangle protrusion), as shown in FIG. 2E. Therefore, when the mounted bosses 124 are inserted into the mounting holes 144, the effect of easy insertion and difficult extraction is achieved.

In addition, the cross section of the mounting hole 144 can be a shape of an ellipse, a polygon, or other shapes. If the cross section of the mounted boss 124 is to be a corresponding shape, the mounted boss 144 would provide positioning function itself. On the contrary, if the cross section of the mounted boss 124 is not to be the corresponding shape, such as a circle, the mounting hole 144 therefore does not provide the positioning function. However, when the mounted bosses 124 are inserted into the mounting holes 144, there is more space for allowing the deformation of the mounted bosses 124 or the mounting holes 144, so as to avoid the structural damage and increase the tolerance of size design. No matter how the cross section of the mounted boss 124 and the mounting hole 144 is designed, it is necessary that the mounted boss 124 can be inserted into the mounting hole 144.

According to the preferred embodiment, each of the mounted bosses 124 further includes a threaded hole 1244 (refer to FIGS. 2D and 2E), such that the keyboard 12 can be mounted on the top plate 142 of the base 14 firmly by screwing a screw into the threaded hole 1244. Although the screw is screwed in the condition that the keyboard 12 and the top plate 142 are reversed, the keyboard 12 would not fall in that the first lock part of the mounted boss 124 has been locked with the second lock part of the mounting hole. Besides, the holding force between the first lock part and the second lock part is much larger than that offered by the temporary lock protrusions, so the keyboard 12 will not fall down in the screwing process.

Consequently, comparing with the prior art, the connection structure of the invention can mount the keyboard firmly without the elastic lock protrusion. Moreover, when the mounted boss further includes a threaded hole, it can enforce the keyboard firmly on the base. Therefore, the keyboard will not fall from the base (due to reversing) while screwing.

With the recitations of the preferred embodiment above, the features and spirits of the invention will be hopefully well described. However, the scope of the invention is not restricted by the preferred embodiment disclosed above. The objective is that all alternative and equivalent arrangements are hopefully covered in the scope of the appended claims of the invention. Accordingly, the above disclosure should be construed as limited only by the metes and bounds of the appended claims.

What is claimed is:

1. A connection structure configured in a data processing apparatus, the data processing apparatus comprising a keyboard and a base, the keyboard having a bottom, the base having a top plate, said connection structure connecting the bottom and the top plate, said connection structure comprising:

a mounted boss disposed on the bottom of the keyboard, the mounted boss comprising a first lock part; and a mounting hole disposed on the top plate of the base, the mounting hole comprising a second lock part;

wherein when the bottom of the keyboard is assembled to the top plate of the base, the mounted boss is inserted into the mounting hole such that the first lock part is locked with the second lock part, and wherein the mounting hole has a third cross section and the mounted boss has a fourth cross section matching with the third cross section, whereby the mounted boss can be inserted into the mounting hole and wherein the third cross section of the mounting hole is polygonal.

2. The connection structure of claim 1, wherein the first lock part is a groove, and the second lock part is a protrusion.

3. The connection structure of claim 2, wherein the groove has a first cross section, and the protrusion has a second cross section matching with the first cross section.

4. The connection structure of claim 3, wherein the first cross section of the groove is semicircular or wedgy.

5. The connection structure of claim 1, wherein the first lock part is a protrusion, and the second lock part is a groove.

6. The connection structure of claim 5, wherein the groove has a first cross section, and the protrusion has a second cross section matching with the first cross section.

7. The connection structure of claim 6, wherein the first cross section of the groove is semicircular or wedgy.

8. The connection structure of claim 1, wherein the third cross section of the mounting hole is elliptic.

9. The connection structure of claim 1, wherein the mounted boss comprises a threaded hole and the keyboard is mounted on the top plate of the base also by screwing a screw into the threaded hole.

10. A data processing apparatus, comprising:
a keyboard having a bottom, a mounted boss being disposed on the bottom, the mounted boss comprising a first lock part; and
a base having a top plate, a mounting hole being disposed on the top plate, the mounting hole comprising a second lock part;
wherein when the bottom of the keyboard is assembled to the top plate of the base, the mounted boss is inserted into the mounting hole such that the first lock part is locked with the second lock part, and
wherein the mounting hole has a third cross section and the mounted boss has a fourth cross section matching with the third cross section, whereby the mounted boss can be inserted into the mounting hole and wherein the third cross section of the mounting hole is polygonal.

11. The data processing apparatus of claim 10, wherein the first lock part is a groove, and the second lock part is a protrusion.

12. The data processing apparatus of claim 11, wherein the groove has a first cross section, and the protrusion has a second cross section matching with the first cross section.

13. The data processing apparatus of claim 12, wherein the first cross section of the groove is semicircular or wedgy.

14. The data processing apparatus of claim 10, wherein the first lock part is a protrusion, and the second lock part is a groove.

15. The data processing apparatus of claim 14, wherein the groove has a first cross section, and the protrusion has a second cross section matching with the first cross section.

16. The data processing apparatus of claim 15, wherein the first cross section of the groove is semicircular or wedgy.

17. The data processing apparatus of claim 10, wherein the third cross section of the mounting hole is elliptic.

18. The data processing apparatus of claim 10, wherein the mounted boss comprises a threaded hole and the keyboard is mounted on the top plate of the base also by screwing a screw into the threaded hole.

* * * * *